(12) United States Patent
Horimai (10) Patent No.: US 7,391,702 B2
(45) Date of Patent: Jun. 24, 2008

(54) HOLOGRAPHIC OPTICAL INFORMATION RECORDING AND REPRODUCING APPARATUS WHICH PARALLEL-TRANSLATES LIGHT RAY FLUX TO CORRECT TILT

(75) Inventor: Hideyoshi Horimai, Yokohama (JP)

(73) Assignee: Optware Corporation, Kanagawa (JP)

( * ) Notice: Subject to any disclaimer, the term of this patent is extended or adjusted under 35 U.S.C. 154(b) by 471 days.

(21) Appl. No.: 10/886,280

(22) Filed: Jul. 7, 2004

(65) Prior Publication Data

US 2005/0030875 A1    Feb. 10, 2005

(30) Foreign Application Priority Data

Jul. 8, 2003    (JP) ............................. 2003-193967

(51) Int. Cl.
*G11B 7/0065* (2006.01)

(52) U.S. Cl. ...................................... 369/103

(58) Field of Classification Search ....................... None
See application file for complete search history.

(56) References Cited

U.S. PATENT DOCUMENTS

| 5,627,808 | A | * | 5/1997 | Hajjar et al. | ............. | 369/44.32 |
| 7,061,852 | B2 | * | 6/2006 | Tsukamoto et al. | ......... | 369/103 |
| 7,116,626 | B1 | * | 10/2006 | Woods et al. | ............... | 369/103 |
| 2004/0037196 | A1 | * | 2/2004 | Matsumoto et al. | ...... | 369/53.19 |

FOREIGN PATENT DOCUMENTS

| JP | 04-362896 | | 12/1992 |
| JP | 09265139 A | * | 10/1997 |
| JP | 11-311938 | | 11/1999 |
| JP | 2000-90463 | | 3/2000 |
| JP | 2001-273650 | | 10/2001 |
| JP | 2003-50128 | | 2/2003 |
| JP | 2003-162830 | | 6/2003 |

* cited by examiner

*Primary Examiner*—Andrea Wellington
*Assistant Examiner*—Michael V Battaglia
(74) *Attorney, Agent, or Firm*—William L. Androlia; H. Henry Koda (57) ABSTRACT

In an optical information recording/reproducing apparatus using holography in which a relative inclination between a recording light or a reproducing light and a recording medium is corrected by using a device which is suitable for size-reduction. Provided is an optical information recording/reproducing apparatus for recording/reproducing information to/from a recording medium through irradiating recording light or reproducing light by an objective lens onto a recording medium to/from which information is recorded/reproduced using holography, wherein light ray flux of the recording light or the reproducing light entering an objective lens is parallel-translated according to a relative inclination between the recording light or the reproducing light and the recording medium.

14 Claims, 11 Drawing Sheets

HOLOGRAPHIC OPTICAL INFORMATION RECORDING AND REPRODUCING APPARATUS WHICH PARALLEL-TRANSLATES LIGHT RAY FLUX TO CORRECT TILT

BACKGROUND OF THE INVENTION

1. Field of the Invention

The present invention relates to an apparatus which performs at least either recording or reproduction of information to/from optical information recording medium to which information is recorded using holography.

2. Description of the Related Art

Conventionally, in holographic recording for recording information onto a recording medium using holography, in general, information light carrying image information and recording-specific reference light overlap with each other in a recording medium and interference pattern generated thereby is written onto the recording medium. For reproducing the recorded information, reproduction-specific reference light is irradiated onto the recording medium so as to reproduce image information by diffraction of the interference pattern (see Japanese Unexamined Patent Publication No. 11-311938).

Recently, for achieving super high density optical recording, volume holography, especially digital volume holography, has been developed to be in practical use and has attracted attention. The volume holography is a method in which the interference patterns are written three-dimensionally by actively utilizing the thickness direction of the recording medium. In the volume holography, the diffraction efficiency is improved by increasing the thickness and the storage capacity can be increased by using multiple-recording. The digital volume holography is a computer-oriented holographic recording method in which image information to be recorded is limited to binary digital patterns, while using the same recording medium and the recording system as that of the volume holography. In the digital volume holography, for example, picture information such as an analog picture is once digitized to be two-dimensional digital pattern and then it is recorded as image information. The digital pattern information is read out and decoded to be displayed as the original picture information. Thereby, even when SN ratio (signal-to-noise ratio) at the time of reproduction is not so good, it becomes possible to reproduce the information which notably faithfully reflects the original information by carrying out differential analysis or carrying out error correction by coding the binary data.

As the holographic recording, an effective method is the one which uses optical pickup devices including an optical system for recording/reproducing information to/from a recording medium by employing a disk-type recording medium such as a CD (compact disk), a DVD (digital versatile disk) and the like.

In general, in an optical disk storage device, a focus servo and a tracking servo are operated by driving an objective lens inside the optical pickup device through rotating a disk-type recording medium. In such a configuration, angle of incident of the light irradiated onto the recording medium from the optical pickup device is altered when the disk-type recording medium is deflected or deformed. However, a CD, a DVD or the like has a configuration in which the magnitude of light reflected by a pit can be read out so that changes in the angle of incident are not significant as long as the light is irradiated onto the pit.

However, in the case of holographic recording, the interference pattern between information light and recording-specific reference light is recorded for recording and diffraction of reproduction-specific reference light and the interference pattern is reproduced for reproduction. Thus, if the information light and each reference light at the time of recording and reproduction do not enter at the same angle, the S/N ratio becomes notably deteriorated.

Therefore, when making the holographic recording fit into a practical use, a device for correcting a relative inclination between the recording medium and the optical pickup device becomes important. Conventionally, there is a method for controlling the angle of incident so that light enters a recording medium always at the same angle by tilting a pickup main body of an optical pickup device according to the relative inclination between the recording medium and the optical pickup device (see Japanese Unexamined Patent Publication No. 2001-273650).

However, the pickup main body includes a light source for generating light, a means for generating information light which carries information by spatially modulating the light from the light source, a means for generating recording-specific reference light and reproduction-specific reference light, various optical systems and an objective lens. Thus, when tilting the pickup main body according to the inclination of the recording medium, a large-scaled driving system for tilting is required. Therefore, it is not suitable for achieving size-reduction.

Further, by tilting the pickup main body, the focal point position of the objective lens is altered. Thus, it is necessary to correct the position, thereby complicating the control.

SUMMARY OF THE INVENTION

An object of the present invention is to provide an optical information recording apparatus or an optical information reproducing apparatus to/from which information is recorded or reproduced using holography, in which the relative inclination between recording light or reproducing light and the recording medium can be corrected using a device suitable for achieving size-reduction.

Further, another object of the present invention is to provide an optical information recording apparatus and an optical information reproducing apparatus which can achieve correction of the relative inclination between the recording light or reproducing light and the recording medium by a simple control.

In order to achieve the foregoing objects, the optical information recording apparatus of the present invention is an optical information recording apparatus for recording information on a recording medium through irradiating recording light by an objective lens onto the recording medium to which information is recorded using holography, and comprises a device for parallel-translating light ray flux of the recording light entering the objective lens according to a relative inclination between the recording light and the recording medium.

Further, the optical information reproducing apparatus of the present invention is an optical information reproducing apparatus for reproducing information from a recording medium through irradiating reproducing light by an objective lens onto the recording medium to which information is recorded using holography, and comprises a device for parallel-translating light ray flux of the reproducing light entering the objective lens according to a relative inclination between the reproducing light and the recording medium.

By employing such a configuration, when the parallel-translated light ray flux of the recording light or the reproducing light enters the objective lens, the angle of incident of the recording light or the reproducing light at the time of entering the recording medium changes. Thus, by controlling the parallel-translation of the light ray flux of the recording light or the reproducing light according to the relative inclination between the recording light or the reproducing light and the recording medium, inclination between the recording light or the reproducing light and the recording medium can be corrected. Therefore, it is unnecessary to tilt the pickup main body itself and the driving system can be reduced in size. Thus, it is suitable for achieving size-reduction compared to the conventional case. Further, the objective lens stays in the same position so that there is no change in the focal point position of the recording light or the reproducing light. Thus, there is no need to correct the focal point position, and the relative inclination between the recoding light or the reproducing light and the recording medium can be corrected by a simpler control compared to the conventional case.

Further, in the optical information recording apparatus of the present invention, the device for parallel-translation is an optical element for directing the recording light towards the objective lens and a driving unit for driving the optical element, and light ray flux of the recording light is parallel-translated by moving the optical element in an optical axis direction of incoming light ray flux.

Also, in the optical information reproducing apparatus of the present invention, the device for parallel-translation is an optical element for directing the reproducing light towards the objective lens and a driving unit for driving the optical element, and light ray flux of the reproducing light is parallel-translated by moving the optical element in an optical axis direction of incoming light ray flux.

By employing such a configuration, the position of the light ray flux of the recording light or the reproducing light entering the objective lens can be controlled by simply moving the optical element for directing the recording light or the reproducing light towards the optical axis direction. Thus, the size of the driving unit can be reduced compared to the conventional case where the pickup main body is driven.

It is preferable that the optical element for directing the recording light or the reproducing light towards the objective lens be a pentagonal prism.

The pentagonal prism is preferable since it deflects the light ray precisely at 90° to be emitted even if the light enters the effective plane at any angles and the emitted image does not rotate or reversely rotate as in the case of 45° rectangular prism or the like.

Further, in the optical information recording apparatus of the present invention, the device for parallel-translation is a plane glass disposed on an optical path of the recording light and a driving unit for driving the plane glass, and light ray flux of the recording light is parallel-translated by tilting the plane glass.

Also, in the optical information reproducing apparatus of the present invention, the device for parallel-translation is a plane glass disposed on an optical path of the reproducing light and a driving unit for driving the plane glass; and light ray flux of the reproducing light is parallel-translated by tilting the plane glass.

By employing such a configuration, the position of the light ray flux of the recording light or the reproducing light entering the objective lens can be controlled by simply tilting the plane glass. Thus, the size of the driving unit can be reduced compared to the conventional case where the pickup main body is driven.

Further, in the optical information recording apparatus of the present invention, the device for parallel-translation is a relay lens disposed on an optical path of the recording light and a driving unit for driving the relay lens, and light ray flux of the recording light is parallel-translated by moving the relay lens in a direction vertical to the optical path.

Also, in the optical information reproducing apparatus of the present invention, the device for parallel-translation is a relay lens disposed on an optical path of the reproducing light and a driving unit for driving the relay lens, and light ray flux of the reproducing light is parallel-translated by moving the relay lens in a direction vertical to the optical path.

By employing such a configuration, the position of the light ray flux of the recording light or the reproducing light entering the objective lens can be controlled by moving the relay lens in the vertical direction with respect to the optical path. Thus, the size of the driving unit can be reduced compared to the conventional case where the pickup main body is driven.

Further, in the optical information recording apparatus of the present invention, the device for parallel-translation is a reflector element disposed at a focal point position of the relay lens being disposed on an optical path of the recording light and a driving unit for driving the reflector element, and light ray flux of the recording light is parallel-translated by tilting the reflector element.

Also, in the optical information reproducing apparatus of the present invention, the device for parallel-translation is a reflector element disposed at a focal point position of the relay lens being disposed on an optical path of the reproducing light and a driving unit for driving the reflector element, and light ray flux of the reproducing light is parallel-translated by tilting the reflector element.

By employing such a configuration, the position of the light ray flux of the recording light or the reproducing light entering the objective lens can be controlled by tilting the reflector element disposed at the focal point position of the relay lens. Thus, the size of the driving unit can be reduced compared to the conventional case where the pickup main body is driven. Also, the optical path is deflected by the reflector element so that it is easier to achieve the optical information recording device with a compact configuration as a whole.

Further, in the optical information recording apparatus of the present invention, the device for parallel-translation is a spatial optical modulator having a plurality of pixels for generating the recording light by modulating irradiated light with each of the pixels, and light ray flux of the recording light is parallel-translated by moving entire modulated patterns formed with the pixels of the spatial optical modulator.

Also, in the optical information reproducing apparatus of the present invention, the device for parallel-translation is a spatial optical modulator having a plurality of pixels for generating the reproducing light by modulating irradiated light with each of the pixels, and light ray flux of the reproducing light is parallel-translated by moving entire modulated patterns formed with the pixels of the spatial optical modulator.

By employing such a configuration, the position of the light ray flux of the recording light or the reproducing light entering the objective lens can be controlled by simply moving the modulation pattern of the spatial optical modulator. Therefore, the inclination of the recording medium can be corrected without adding another structural element. Also, the driving system becomes unnecessary so that it is advantageous in terms of size-reduction.

DETAILED DESCRIPTION OF THE PREFERRED EMBODIMENTS

Embodiments of the present invention will be described hereinafter by referring to the accompanying drawings.

The basic concept of the present invention will be described by referring to FIG. 1. FIG. 1A to FIG. 1D are illustration showing light rays 3a to 3e as recording light or reproducing light irradiated onto a recording layer of a recording medium by an objective lens 1. As shown in FIG. 1A, parallel light ray flux of the light rays 3a to 3e becomes a convergent light ray flux upon entering the objective lens 1, being converged towards a focal point f in the recording layer 2.

Looking at this phenomenon from a different point of view, it can be seen that each of the light rays 3a to 3e enters the recording layer 2 of the recording medium at different angles. That is, in FIG. 1A, the light rays 3a and 3b enter the recording layer 2 from the left side, the light ray 3c from the front, and the light rays 3d and 3e from the right side. Therefore, the angle of incident of the light ray flux entering the recording layer 2 of the recording medium can be altered according to the position of parallel light ray flux for entering the objective lens 1.

Therefore, as shown in FIG. 1B, when the recording medium is not inclined, information can be recorded or reproduced to/from an irradiation region 2a by irradiating the light ray flux onto the recording layer 2 from the front of the recording medium. Further, as shown in FIG. 1C, when the recording medium is inclined at an angle of θ, information may be recorded or reproduced to/from the irradiation region 2a by irradiating the light ray flux onto the recording layer 2 from the front of the inclined recording medium, using the parallel light ray flux of the light rays 3a to 3c. Inversely, as shown in FIG. 1D, when the recording medium is inclined at an angle of −θ, information may be recorded or reproduced to/from the irradiation region 2a by irradiating the light ray flux onto the recording layer 2 from the front of the inclined recording medium, using the parallel light ray flux of the light rays 3c to 3e. In FIG. 1B to FIG. 1D, the recording layer 2 before being inclined is shown by a dotted line so as to clearly show the inclination θ, −θ.

Figure 1:
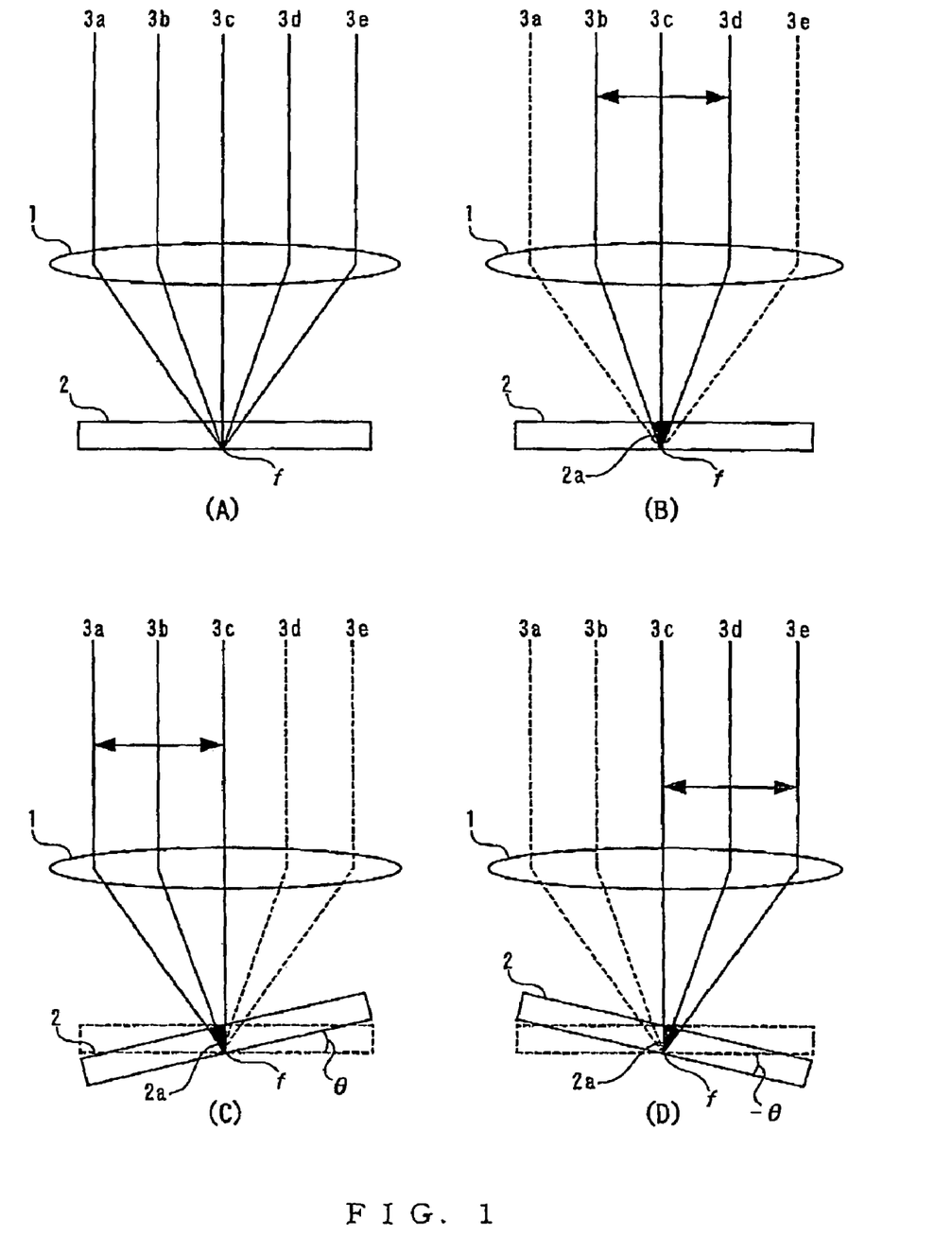
FIG. 1A to FIG. 1D are illustrations for describing the basic concept of the present invention.

As can be seen from FIG. 1, the angle of incident of the light ray entering the recording layer 2 corresponds to the distance from the center of the objective lens 1 to the recording layer. Thus, when the inclination of the recording medium is small, the light ray can be directed to a position close to the center of the objective lens and, when the inclination is large, the light ray can be directed to a position distant from the center of the objective lens 1. Thereby, the light rays can be irradiated onto the recording layer in accordance with the inclination of the recording medium.

Further, even when the position at which each light ray of the parallel light ray flux enters the objective lens 1 differs, the light rays converge towards the focal point so as to be irradiated onto the same position of the recording layer.

As described, by controlling the position at which the parallel light ray flux enters the objective lens 1 corresponding to the relative inclination between the recording medium and the optical pickup device, the light ray flux can be always irradiated to the recording layer 2 of the recording medium at the same angle and the relative inclination between the recording medium and the optical pickup device can be corrected.

Next, an optical information recording apparatus using holography will be described by referring to FIG. 2 to FIG. 5.

Figure 2:
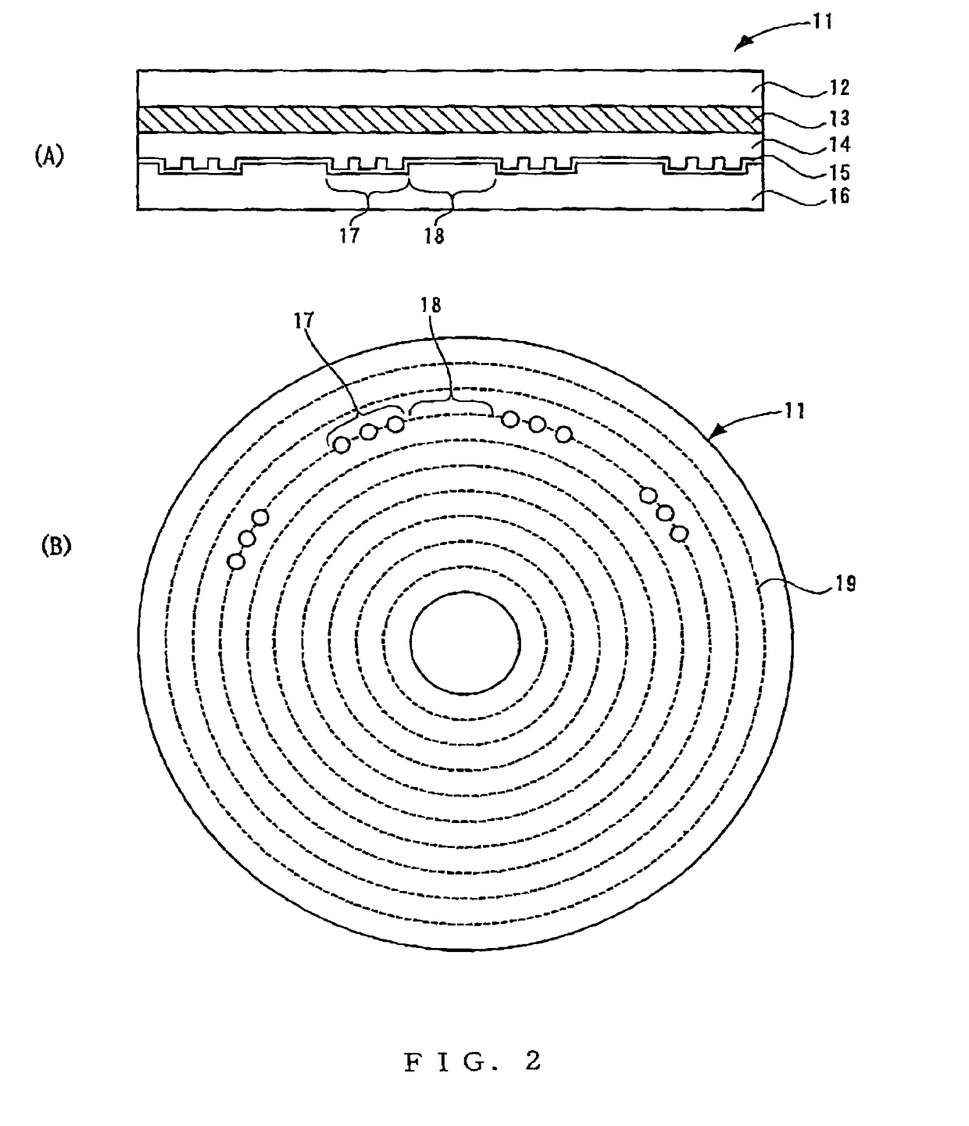
FIG. 2A is a schematic cross section of a recording medium of the present invention and FIG. 2B is a schematic plan view of the recording medium.

FIG. 2 are schematic views showing an example of a recording medium 11 used for holographic recording. FIG. 2A is a schematic cross section taken along a track 19 and FIG. 2B is a schematic plan view of the same. In the recording medium 11, an information recording layer 13 is provided under a circular transparent substrate 12 and a reflector layer 15 is provided via a transparent middle layer 14. These are laminated with a substrate 16 to form the recording medium 11. In the circulate recording medium 11, the track 19 is provided concentrically or helically (shown by a dotted line in FIG. 2B). In the reflector layer 15, a plurality of address servo regions 17 are arranged in the radial direction at prescribed angle intervals and an information recording region 18 is provided in between the address servo regions 17 which are provided next to each other in the circumferential direction. In the address servo region 17, information for performing focus servo control and tracking servo control and address information for the information recording region 18 are recorded beforehand by an emboss pit. As the information for performing the tracking servo control, for example, a wobble pit can be used.

As a specific configuration of the recording medium 11, the transparent substrate 12 has an appropriate thickness of, for example, 0.6 mm or less and the information recording layer 13 has an appropriate thickness of, for example, 10 μm. The information recording layer 13 is formed by a hologram recording material in which the optical properties such as the refractive index, dielectric constant, reflectance and the like change according to the strength of a laser beam when being irradiated by the laser beam for a prescribed length of time. For example, Photopolymers HRF-600 (name of the product), the products of Dupon, or the like can be used.

Figure 3:
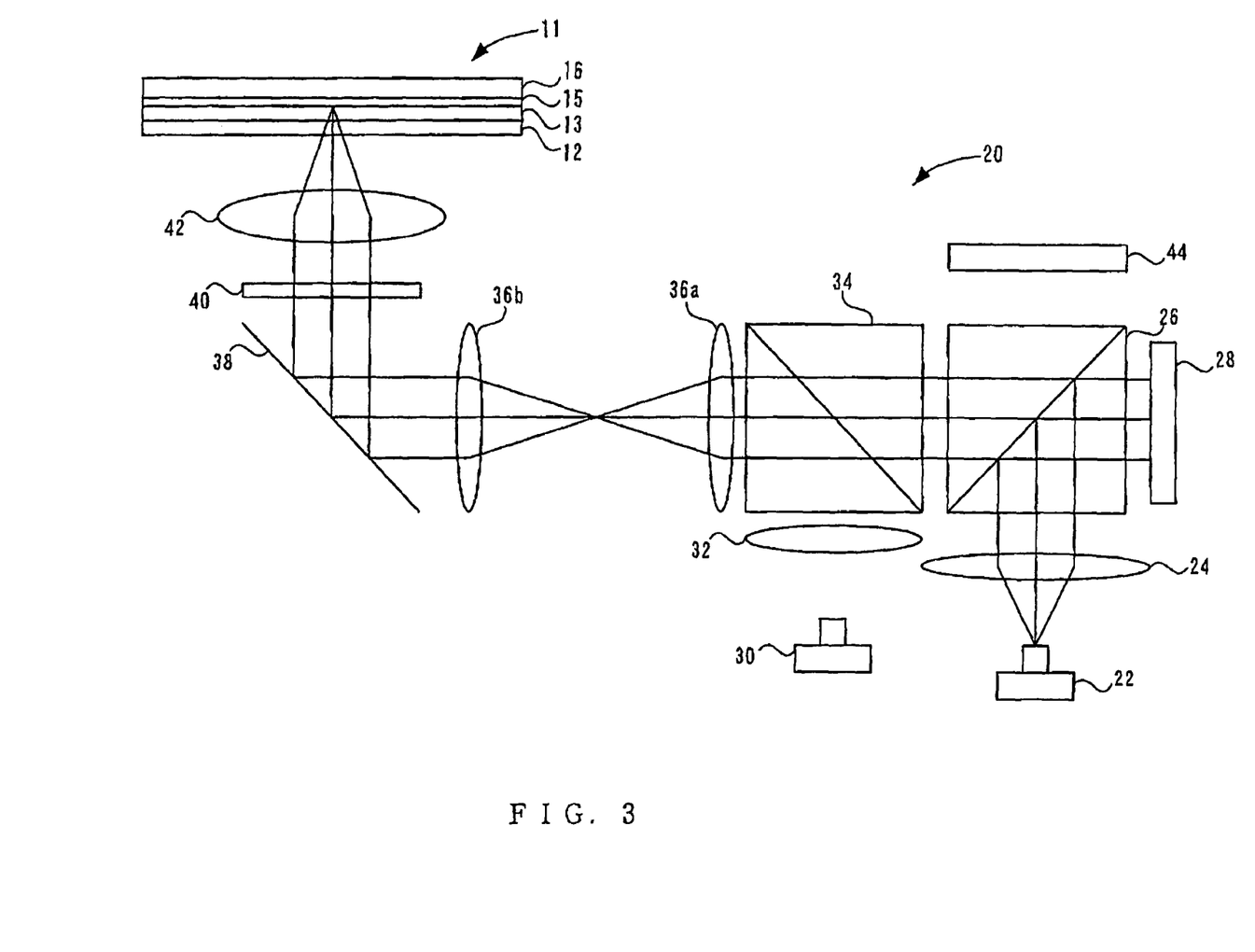
FIG. 3 is an illustration showing optical paths of recording light at the time of recording performed in an optical information recording/reproducing apparatus of the present invention.
Figure 4:
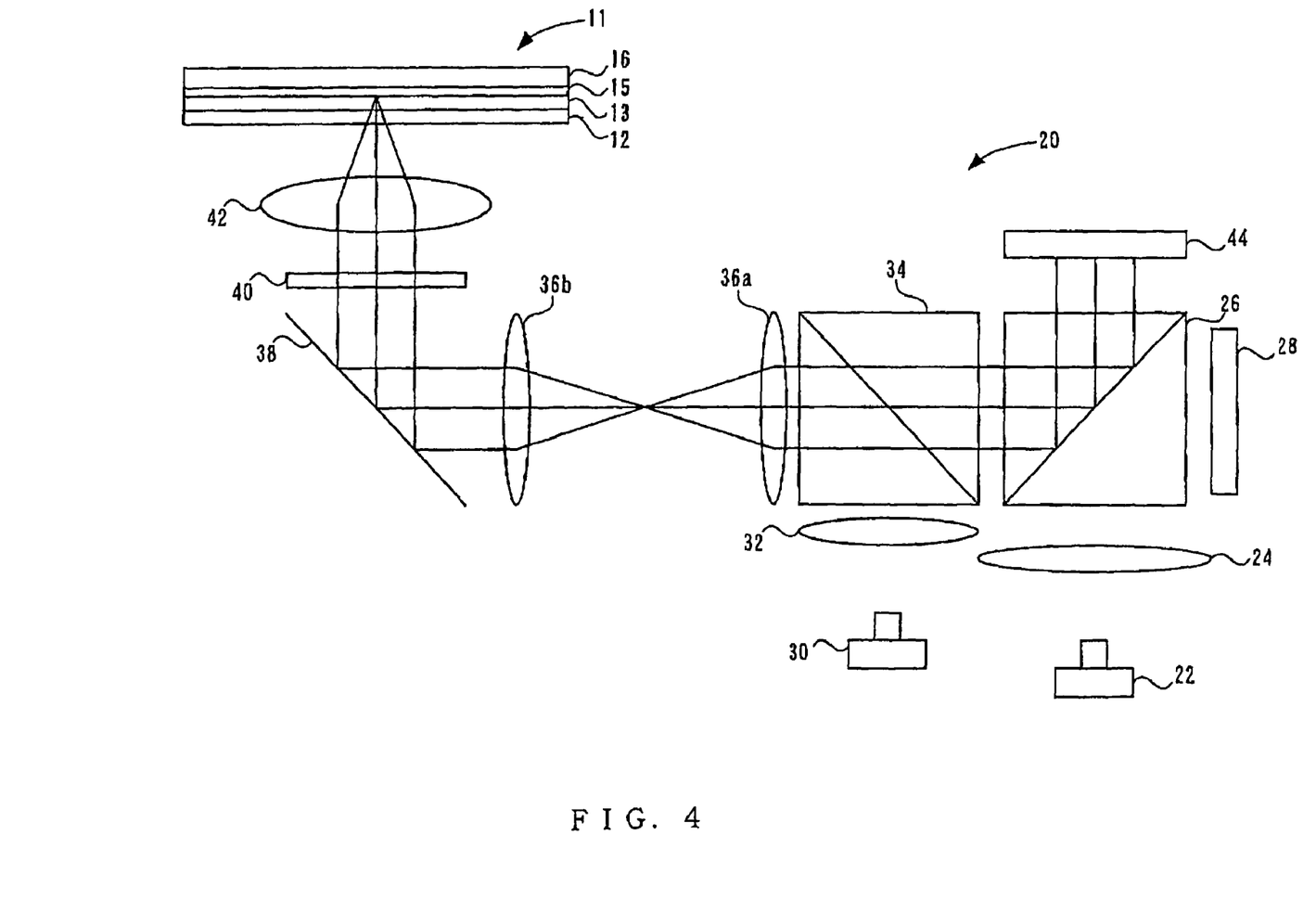
FIG. 4 is an illustration showing optical paths of reproducing light at the time of reproducing performed in the optical information recording/reproducing apparatus of the present invention.
Figure 5:
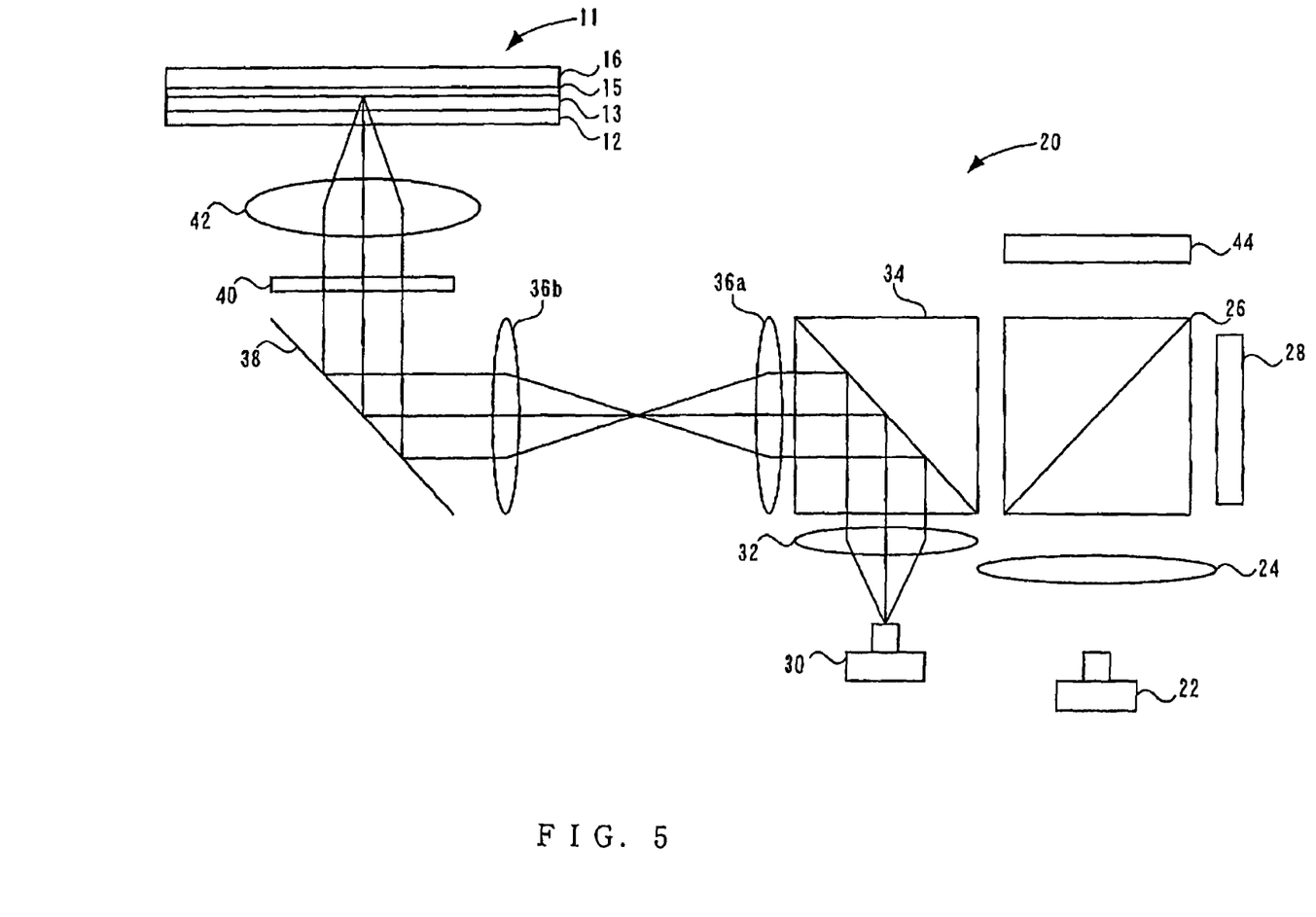
FIG. 5 is an illustration showing optical paths of servo light at the time of reading out the pit in the optical information recording/reproducing apparatus of the present invention.

FIG. 3 to FIG. 5 show an embodiment of an optical information recording/reproducing apparatus 20. FIG. 3 shows the optical paths of the recording light at the time of recording, FIG. 4 shows the optical paths of reproducing light at the time of reproducing, and FIG. 5 shows the optical paths of the light from a servo light source used for reading out the pit.

As shown in FIG. 3 to FIG. 5, the optical information recording/reproducing apparatus 20 comprises a recording/reproducing light source 22, a collimator lens 24, a polarization beam splitter 26, a spatial optical modulator (information expressing means) 28, a servo reader element 30, a collimator lens 32, a dichroic mirror 34, relay lenses 36a, 36b, a mirror 38, a quarter-wave plate 40, an objective lens 42, and an optical detector 44. In FIG. 3 to FIG. 5, the recording medium 11 is simply illustrated by showing only the circular transparent 12, the information recording layer 13, the reflector layer 15 and the substrate 16 while the pit and the like are being omitted.

As the recording/reproducing light source 22, it is possible to use, for example, a semiconductor laser which generates the light ray flux of coherent linearly polarized light rays. As the recording/reproducing light source 22, the one with a short wavelength is advantageous for performing high-density recording and it is preferable to employ a blue laser or green laser.

The collimator lens 24 converts diverging light ray flux from the recording/reproducing light source 22 into substantially parallel light rays. The polarization beam splitter 26 is formed to reflect or transmit the linearly polarized light (for example, P-polarization) generated from the recording/reproducing light source 22 and to transmit or reflect the linearly polarized light (for example, S-polarization) which is vertical to the polarized light.

The spatial optical modulator (information expressing means) 28 comprises a number of pixels arranged in lattice form and it is possible to select by each pixel whether or not the polarizing direction of the emitting light is rotated by 90° with respect to the polarizing direction of the incoming light. As the spatial optical modulator 28, it is possible to use, for example, a reflection-type liquid crystal element using optical rotation characteristic of the liquid crystal in which the polarization plate on the incidence/emission side is omitted. The spatial optical modulator 28 constitutes an information light generator, a recording-specific reference light generator and a reproduction-specific reference light generator.

The servo reader element 30 is for reading out the emboss pit formed in the address servo region 17 of the recording medium 11 and comprises a light source for generating servo light for reading out the emboss pit, e.g., a semiconductor laser and also an optical detector for receiving the light returned from the recording medium 11 through the emboss pit. The light source of the servo reader element 30 is selected to have a wavelength different form that of the recording/reproducing light source 22 and not to affect the information recording layer 13 of the recording medium 11. For example, an infrared laser can be used.

The collimator lens 32 converts the servo light from the servo reader element 30 into substantially parallel light rays and converges the light returned from the recording medium 11 onto the optical detector of the servo reader element 30. The dichroc mirror 34 is formed to reflect or transmit the wavelength light generated from the recording/reproducing light source 22 and to transmit or reflect the wavelength light generated from the servo reader element 30.

The relay lenses 36a, 36b are pair of lens group for forming an image displayed on the spatial optical modulator 28 as a real image once again.

The mirror 38 is an optical element for directing the recording light and the reproducing light towards the objective lens 42, and a reflecting mirror, a half mirror, a 45° rectangular prism, a pentagonal prism or the like can be used.

The quarter-wave plate 40 is a phase plate for changing the optical path difference between the polarized light rays oscillating in the vertical directions from each other by ¼ wavelength. By the quarter-wave plate 40, the P-polarization is converted into the circular polarization. Further, the circular polarization is converted into the S-polarization after passing through the quarter-wave plate 40.

The objective lens 42 is for converging the recording light and the reproducing light onto the recording medium 11. The recording light and the reproducing light are irradiated onto a prescribed position of the recording medium 11 by the objective lens 42.

The optical detector 44 is for reproducing the recorded information by receiving the reproducing light and comprises a number of light-receiving elements arranged in lattice form. As the light-receiving element, a CCD array which employs a CCD (charge coupled device), a CMOS sensor which employs a CMOS (complementary metal-oxide semiconductor), or the like can be used.

The optical path of the recording light at the time of recording will be described by referring to FIG. 3. First, the light ray flux emitted from the recording/reproducing light source 22 is converted into a substantial parallel light ray flux by the collimator lens 24, reflected by the polarization beam splitter 26, and enters the spatial optical modulator 28.

The spatial optical modulator 28 selects by each pixel whether or not to rotate the polarizing direction by 90° and displays the modulation pattern. Thereby, it becomes possible to make the incoming light carry prescribed information. The information light and the recording-specific reference light can be generated at the same time by displaying the pattern of the information as the recording target in the center of the display pattern and displaying the pattern for generating the recording-specific reference light on the periphery in circular form.

The recording light formed with the information light and the recording light generated as described transmits through the polarization beam splitter 26 and the dichroic mirror 34, and is directed by the mirror 38 towards the objective lens 42 direction after passing through the relay lenses 36a, 36b. It is then converted from the linearly polarized light to the circularly polarized light by the quarter-wave plate 40 and is irradiated onto the recording medium 11 by the objective lens 42. In the recording medium 11, the information light of the recording light and the recording-specific reference light interferes with each other and the interference pattern is recorded in the information recording layer 13.

The action of the reproducing light at the time of reproducing is basically the same as that of FIG. 3. However, at the time of reproduction, as the modulation pattern displayed in the spatial optical modulator 28, the pattern for generating the reproduction-specific reference light is displayed and the reproduction-specific reference light is generated as the reproducing light. The reproduction-specific reference light as the reproducing light, when irradiated to the recording medium 11, is diffracted by the interference pattern recorded in the information recording layer 13 and the reproduced light carrying the information on the interference pattern is generated.

In the followings, the optical paths of the reproduced light will be described by referring to FIG. 4. The reproduced light generated from the recording medium 11 has the same polarization as that of the reproduction-specific reference light as the generating source. The reproduction-specific reference light in the circularly polarized state also enters the recording medium 11 through the optical path of the recording light described above so that the reproduced light also has the circular polarization. The reproduced light becomes a parallel light ray flux by the objective lens 42 and is converted into the linearly polarized light (the polarization plane is vertical with respect to the linearly polarized light of the reproduction-specific reference light at the time of incidence) by the quarter-wave plate 40. Subsequently, the reproduced light is reflected by the mirror 38, transmits through the dichroic mirror 34 after passing through the relay lenses 36*a*, 36*b*. It is then reflected by the polarization beam splitter 26, received by the optical detector 44 and reproduced.

When reading out the servo, as shown in FIG. 5, the servo light emitted from the servo reader element 30 is converted into substantially parallel light rays by the collimator lens 32 and reflected by the dichroic mirror 34. The servo light is then reflected by the mirror 38 after passing through the relay lenses 36*a*, 36*b*, passes through the quarter-wave plate 40, and irradiated to the recording medium 11 by the objective lens 42.

The servo light reflected by the reflector layer 15 of the recording medium 11 carrying the emboss pit information enters the servo reader element 30 through the same optical paths. The optical detector of the servo reader element 30 can obtain the position information from the received light. It is also possible to detect the relative inclination between the recording light or the reproducing light and the recording medium 11 by reading out the servo.

The relative inclination between the recording light or the reproducing light and the recording medium is caused, for example, when the recording medium 11 inclines or bends along the radial direction or when the recording medium 11 inclines or bends along the circumferential direction.

There is a method as described below for detecting the relative inclination. First, information for detecting the inclination is recorded in a plurality of prescribed regions of the recording medium 11 by the information light and the recording-specific reference light, which are modulated in a checkered pattern with no relative inclination. When detecting the inclination by reproducing the information for detecting inclination under the state with no relative inclination, the output difference between the two pixels next to each other in the longitudinal or lateral direction of the checkered pattern detected by the detector becomes the greatest. Meanwhile, when there is a relative inclination between the recording light or the reproducing light and the recording medium, the output difference between the two pixels next to each other in the longitudinal or lateral direction of the checkered pattern detected by the detector is reduced. Therefore, the level and direction of the relative inclination between the recording light or the reproducing light and the recording medium can be detected from the reduction amount of the output difference between the two pixels next to each other in the longitudinal direction and from the reduction amount of the output difference between the two pixels next to each other in the lateral direction.

Further, a prescribed pattern by the pit is formed beforehand in the recording medium 11, the servo light is irradiated to the pattern, and the diffracted light by the pattern is received by the optical detector whose light-receiving unit is divided into a plurality of sections. Having the state with no relative inclination between the recording light or the reproducing light and the recording medium 11 as the reference, the direction of the displacement and the amount of displacement of the diffracted light are calculated based on the output of the optical detector. Thereby, the direction and the level of the relative inclination between the recording light or the reproducing light and the recording medium can also be detected.

The above-described configuration is only one of possible embodiments and it is not intended to limit the optical information recording/reproducing apparatus of the present invention and positions of each structural element can be modified. Also, as for the optical information reproducing apparatus, the recording function may be omitted. Further, a reproducing light source may be employed instead of the recording/reproducing light source 22 and the optical system for forming the recording light becomes unnecessary. The reproducing light may be with low output since there is no need to perform recording in the information recording layer unlike the recording/reproducing light source 22. In the optical information recording/reproducing apparatus with the above-described configuration, the spatial optical modulator 28 generates both the recording light and the reproducing light. Thus, by simply changing the recording/reproducing light source with the reproducing light source, it can be used as the optical information reproducing apparatus.

A device for parallel-translating the light ray flux of the recording light entering the objective lens will be described by referring to FIG. 6 to FIG. 11.

Figure 6:
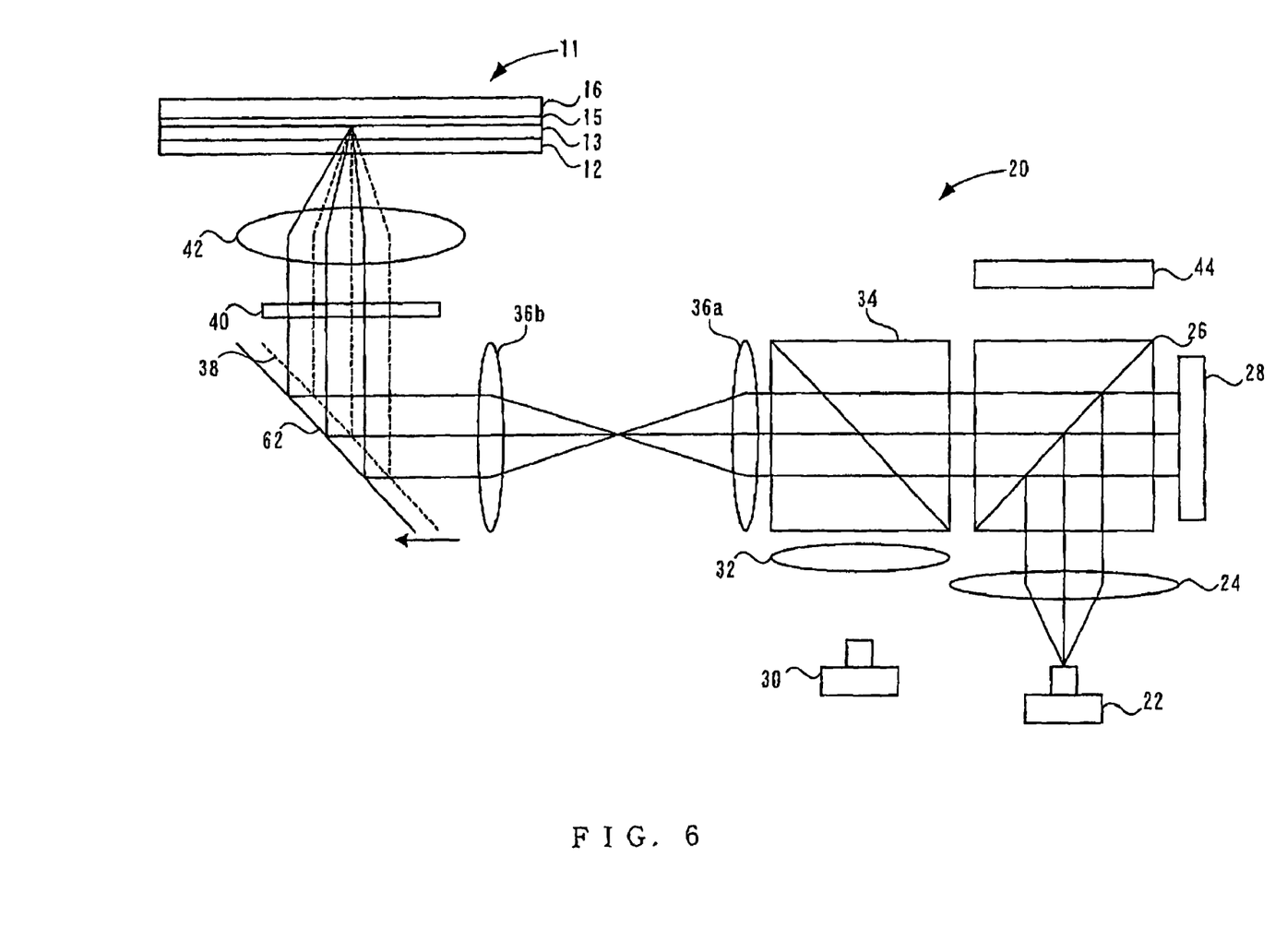
FIG. 6 is a schematic cross section showing an embodiment of the optical information recording/reproducing apparatus of the present invention.

As an embodiment of the device for parallel-translating the light ray flux of the recording light or the reproducing light entering the objective lens, an optical element for directing the recording light or the reproducing light towards the objective lens and a driving unit for driving the optical element can be employed. FIG. 6 shows the optical paths of the light ray flux when the optical element is moved. In FIG. 6, the position and the optical path of the mirror 38 shown in FIG. 3 is shown by a dotted line so as to clearly indicate that the light ray flux is parallel-translated.

In FIG. 6, the mirror 38 is employed as the optical element. Also, a half mirror, a 45° rectangular prism, a pentagonal prism or the like can be employed. Especially, the pentagonal prism is preferable since it can emit the light ray through deflecting it by precisely 90° even if the light enters an effective plane at any angles and the emitted image does not rotate or reversely rotate as in the case of the 45° rectangular prism or the like. As the driving unit, a linear motor, a micro actuator or the like can be used as appropriate.

By moving the optical element in the optical axis direction by the driving unit, the light ray flux of the recording light or the reproducing light can be parallel-translated. In this case, the moving distance of the optical element directly corresponds to the distance of the parallel-translation of the light ray flux so that it is easily controlled. As shown in FIG. 6, when the optical element is moved from the position of the mirror 38 (shown by a dotted line) to the position of a mirror 62, the light ray flux of the recording light or the reproducing light are to enter from the moved direction (on the left side in FIG. 6). When the moving distance increases, the change in the angle of incident of the light ray flux also increases. Thus, by controlling the moving distance and the moving direction of the optical element according to the relative inclination between the recording light or the reproducing light and the recording medium, the light ray flux of the recording light or the reproducing light entering the objective lens can be parallel-translated so as to correct the inclination of the recording medium.

Figure 7:
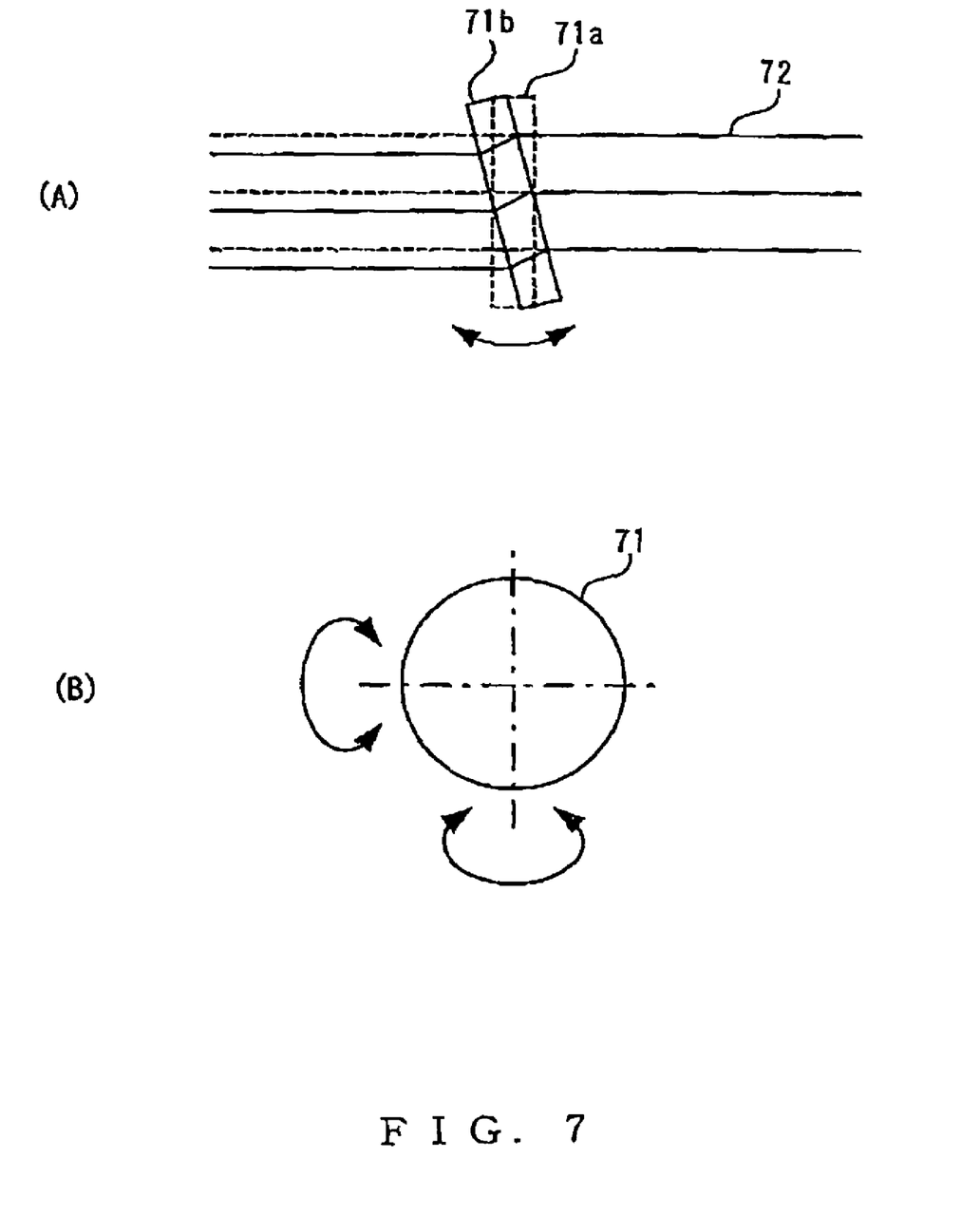
FIG. 7A and FIG. 7B are illustrations for describing an embodiment of a device for parallel-translating the light lay flux according to the present invention.

As another embodiment of the device for parallel-translating the light ray flux of the recording light or the reproducing light entering the objective lens, a plane glass disposed on the optical path of the recording light or the reproducing light and a driving unit for driving the plane glass can be employed.

FIG. 7 are illustrations for describing the parallel-translation of the light ray flux by the plane glass. FIG. 7A is a cross section of the optical paths of the light ray flux 72 and FIG. 7B is a front elevational view of the optical paths. The plane glass 71 is disposed on the optical paths of the light ray flux 72. As shown by a dotted line in FIG. 7A, when a plane glass 71a is vertical with respect to the light ray flux 72, there is no affect on the optical path of the light ray flux. However, when a plane glass 71b inclines with respect to the light ray flux, the light ray flux 72 entering the plane glass 71b is refracted and the light ray flux emitted from the plane glass 71b is parallel-translated with respect to the position before entering the plane glass 71b. By increasing the inclination of the plane glass 71 with respect to the light ray flux 72, the distance of the parallel-translation of the light ray flux 72 can be increased. As shown in FIG. 7B, with a configuration in which the plane glass 71 can be rotatable biaxially, it is possible to deal with the case where the recording medium inclines in the radial direction or in the circumferential direction. Thus, the light ray flux of the recording light or the reproducing light entering the objective lens can be parallel-translated by controlling the inclination and the axis of the plane glass 71 according to the relative inclination between the recording light or the reproducing light and the recording medium so that the inclination of the recording medium can be corrected. The plane glass is disposed in the position where the flux of the light rays is a parallel light ray flux and not to be disposed in the position between the relay lenses (36a, 36b in FIG. 3) or the like where the light ray flux converges/diverges.

Figure 8:
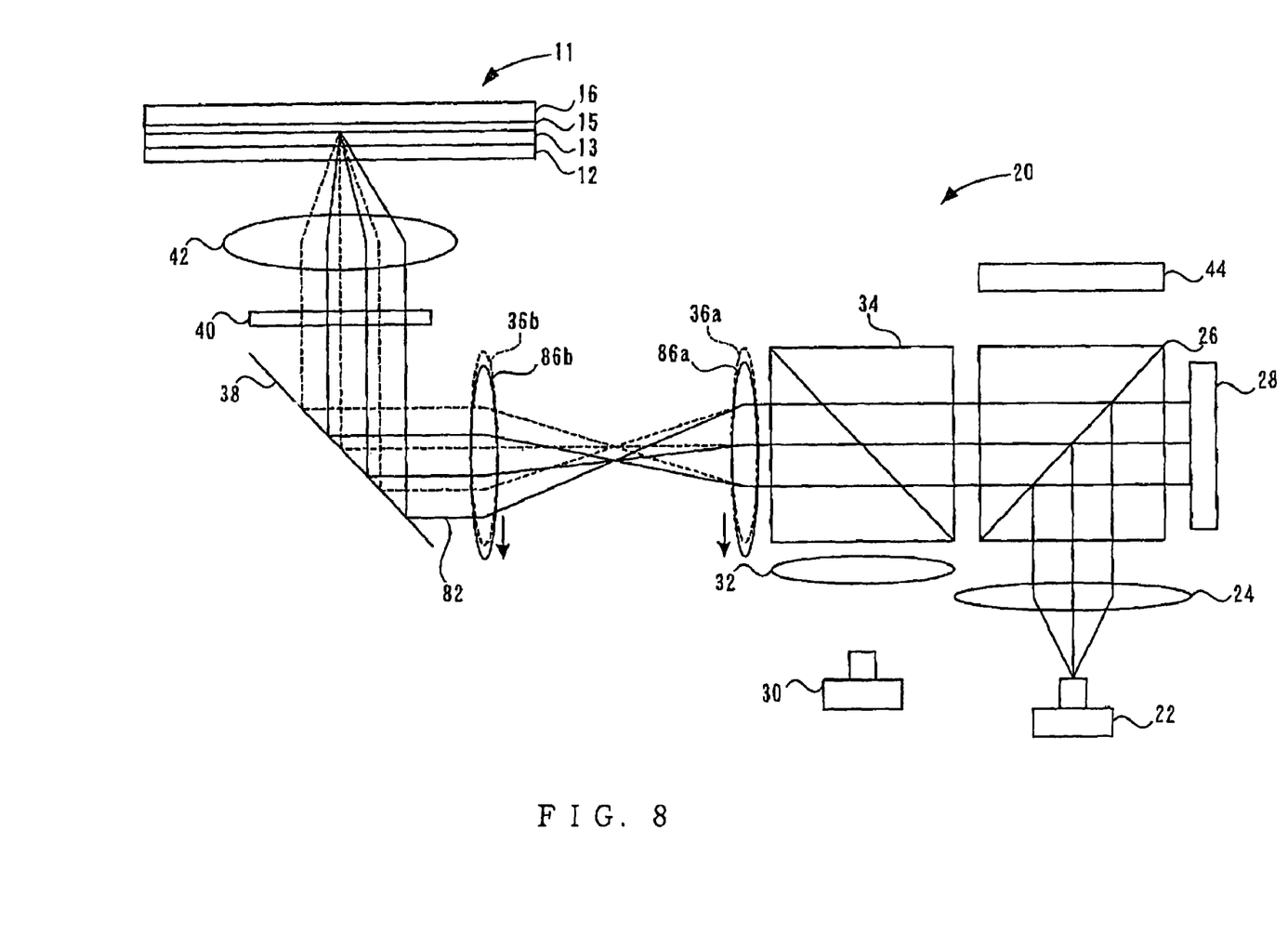
FIG. 8 is a schematic cross section showing another embodiment of the optical information recording/reproducing apparatus of the present invention.

Further, as still another embodiment of the device for parallel-translating the light ray flux of the recording light or the reproducing light entering the objective lens, a relay lens disposed on the optical path of the recording light or the reproducing light and a driving unit for driving the relay lens can be employed. The relay lens made of a pair of lens group is required to be moved as a whole and the moving direction is also set to be vertical with respect to the optical axis. FIG. 8 shows the optical paths of the light ray flux when the relay lens is moved. In FIG. 8, the position and the optical paths of the relay lens shown in FIG. 3 are shown by a dotted line so as to clearly indicate that the light ray flux is parallel-translated.

As shown in FIG. 8, when moving the relay lenses 36a, 36b together downwards to be disposed in the positions of relay lenses 86a, 86b, light ray flux 82 passed through the relay lenses 86a, 86b are parallel-translated downwards compared to the light ray flux (shown by a dotted line) before being moved. The light ray flux 82 is reflected by the mirror 38, enters the objective lens 42 in the state being moved on the right side in FIG. 8, and enters the recording medium 11 from the right side. When the relay lens is moved vertically with respect to the optical axis as described above, the light ray flux 82 also parallel-translated in the moving direction of the relay lens. Thus, by making the relay lens be movable in the vertical and lateral directions, it enables to deal with the inclinations of the recording medium in any directions. When the moving distance of the relay lens increases, the change in the angle of incident of the light ray flux also increases. Thus, by controlling the moving distance and the moving direction of the relay lens according to the relative inclination between the recording light or the reproducing light and the recording medium, the light ray flux of the recording light or the reproducing light entering the objective lens can be parallel-translated. Thereby, the inclination of the recording medium can be corrected.

Figure 9:
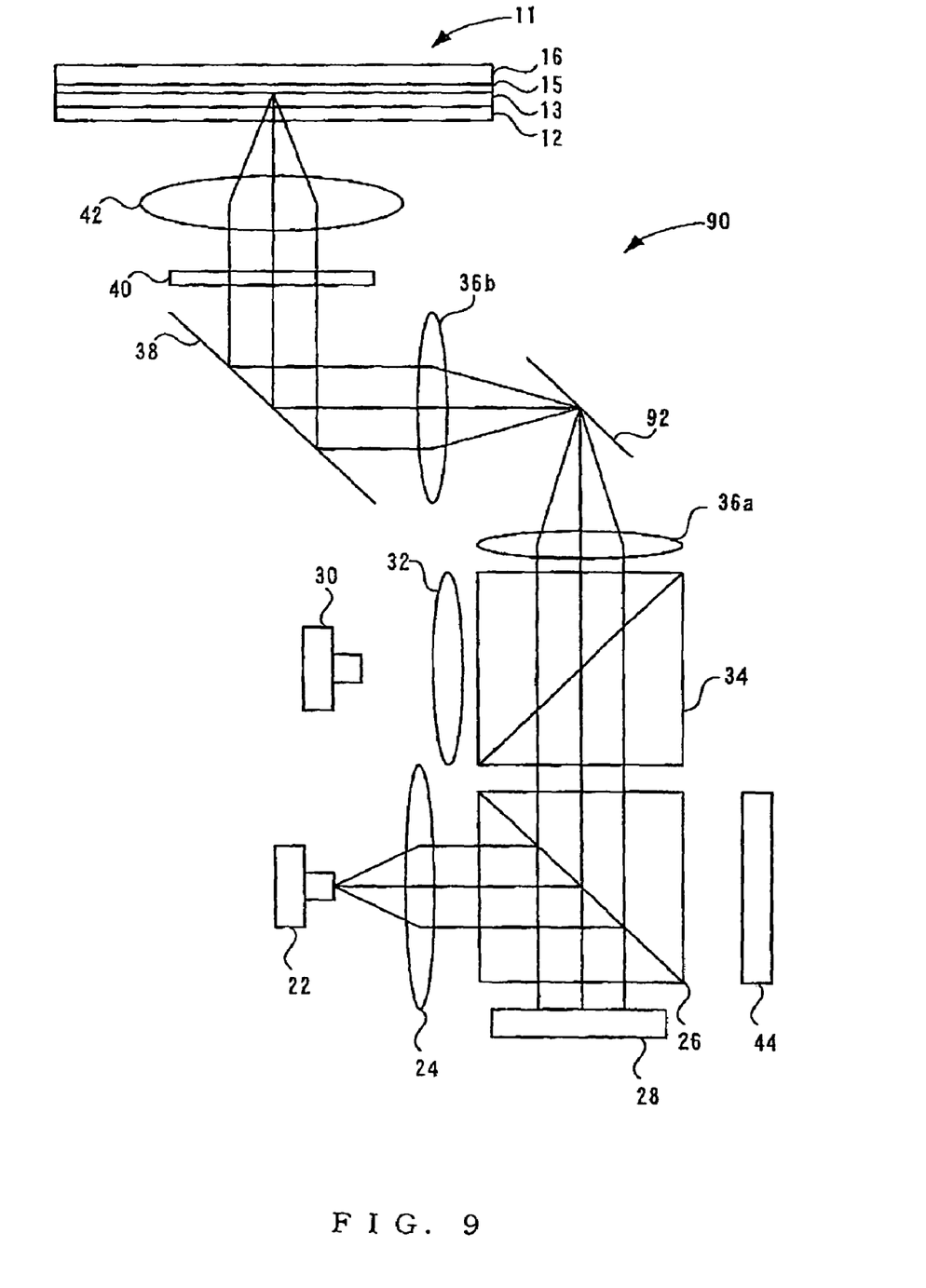
FIG. 9 is a schematic cross section showing still another embodiment of the optical information recording/reproducing apparatus of the present invention.

As yet another embodiment of the device for parallel-translating the light ray flux of the recording light or the reproducing light entering the objective lens, a reflector element disposed at the focal point position of the relay lens being disposed on the optical path of the recording light or the reproducing light and a driving unit for driving the reflector element can be employed. FIG. 9 shows the configuration in which the reflector element is disposed at the focal point position of the relay lens. The optical information recording recording/reproducing apparatus 90 shown in FIG. 9 has the configuration in which the optical system of the optical information recording/reproducing apparatus 20 shown in FIG. 3 is bent in the focal point position of the relay lenses 36a, 36b by 45°, and a reflector element 92 is disposed at the focal point position. The optical paths of the recording light or the reproducing light in the optical information recording/reproducing apparatus 90 are the same as that of the optical information recording/reproducing apparatus 20 shown in FIG. 3 except that the light from the relay lens 36a is reflected by the reflector element 92 at the focal point position towards the relay lens 36b. As the reflector element 92, a reflecting mirror, a half mirror, a rectangular prism or the like can be used.

Figure 10:
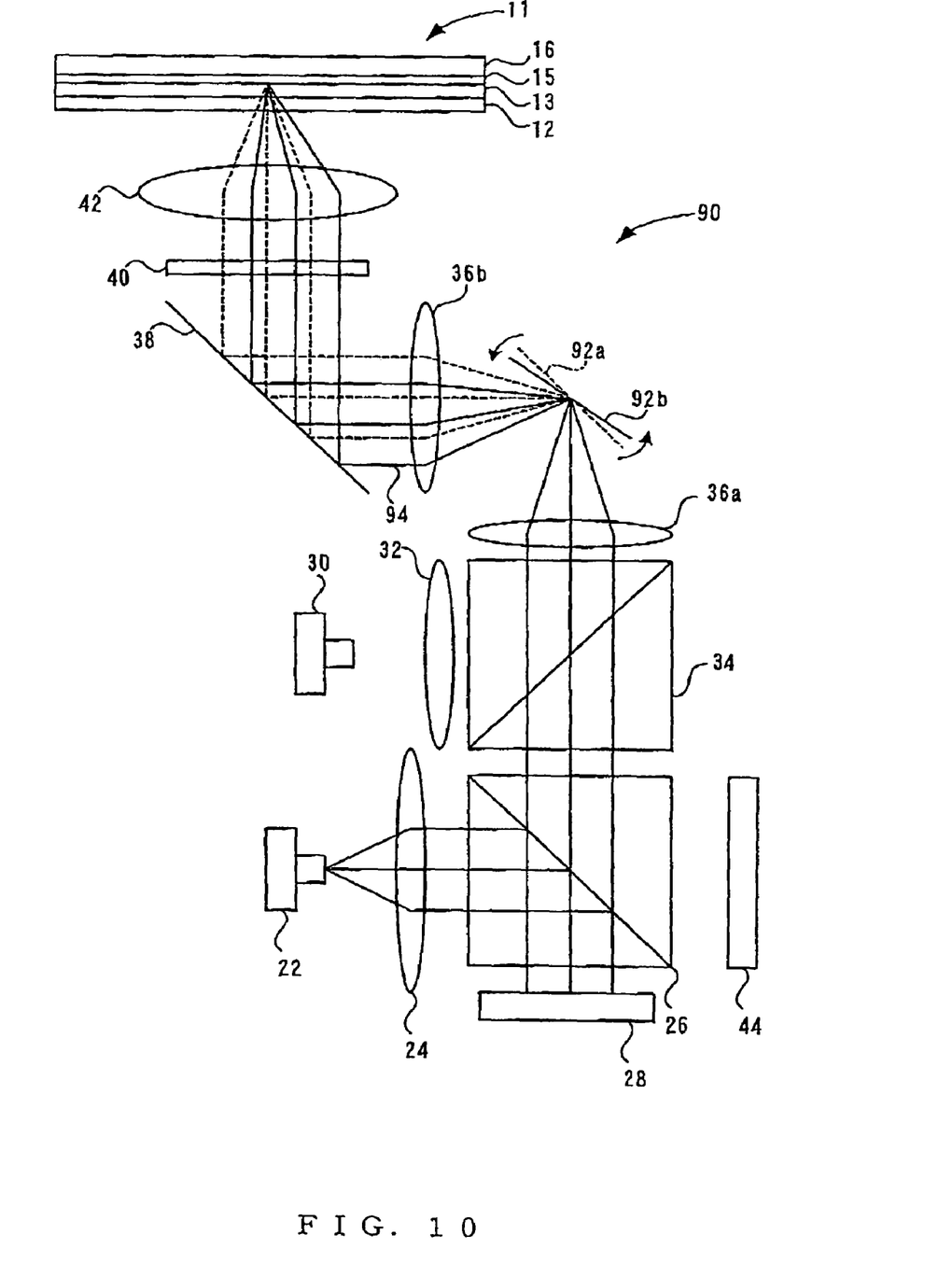
FIG. 10 is a schematic cross section showing yet another embodiment of the optical information recording/reproducing apparatus of the present invention.

In the optical information recording/reproducing apparatus 90, by changing the inclination of the reflector element 92, the light ray flux can be parallel-translated as shown in FIG. 10. In FIG. 10, the position and the optical paths of the reflector element 92a in FIG. 9 are shown by a dotted line so as to clearly indicate that the light ray flux is parallel-translated. As shown in FIG. 10, by tilting the reflector element 92a counterclockwise to be in the position of a reflector element 92b, a parallel light ray flux 94 passed through the relay lens 36 is parallel-translated downwards. Thus, the light ray flux 94 reflects by the mirror 38, enters the objective lens 42 in the state being parallel-translated on the right side in FIG. 10, and enters the recording medium 11 from the right side. When the reflector element 92 is tilted as described above, the light ray flux 94 is also parallel-translated in the moving direction of the reflector element 92. Thus, by making the reflector element 92 be rotatable biaxially as shown in FIG. 7B, it enables to deal with the inclinations of the recording medium in any directions. When the reflector element 92 is more inclined, the change in the angle of incident of the light ray flux also increases. Therefore, by controlling the level and direction of the inclination according to the relative inclination between the recording light or the reproducing light and the recording medium, the light ray flux of the recording light or the reproducing light entering the objective lens can be parallel-translated so as to correct the inclination of the recording medium.

As yet another embodiment of the device for parallel-translating the light ray flux of the recording light or the reproducing light entering the objective lens, a spatial optical modulator for generating the recording light or the reproducing light can be employed. That is, by moving the entire module pattern formed with each pixel of the spatial optical modulator, the light ray flux of the recording light or the reproducing light can be parallel-translated.

FIG. 11A and FIG. 11B are plan views showing the modulation pattern of the spatial optical modulator 110 and FIG. C is a schematic view showing the optical paths of the light ray flux emitted from the spatial optical modulator 110. In FIG. 11A and FIG. 11B, the modulation pattern of the spatial optical modulator 110 displays the information for generating the recording-specific reference light or the reproduction-specific reference light in a circular display region 112 and displays the information for generating the information light in a region 114 on the inner side of the circular display region 112. When the recording medium is not inclined, as shown in FIG. 11A, the center of the modulation pattern is to be in the center of the spatial optical modulator 110 for display. Meanwhile, when the recording medium is not inclined, as shown in FIG. 11B, the entire modulation patterns 112a, 114a are moved downwards from the center of the spatial optical modulator 110 for displaying display patterns 112b and 113b. Thereby, as shown in FIG. 11C, as for the recording light or the reproducing light emitted from the spatial optical modulator 110, the light ray flux 116b by the modulation pattern in FIG. 11B is parallel-translated with respect to the light ray flux 116a by the modulation pattern in FIG. 11A. As a result, by transmitting through the relay lenses 36a, 36b, the light ray flux 116b is parallel-translated upwards with respect to the light ray flux 116a.

Figure 11:
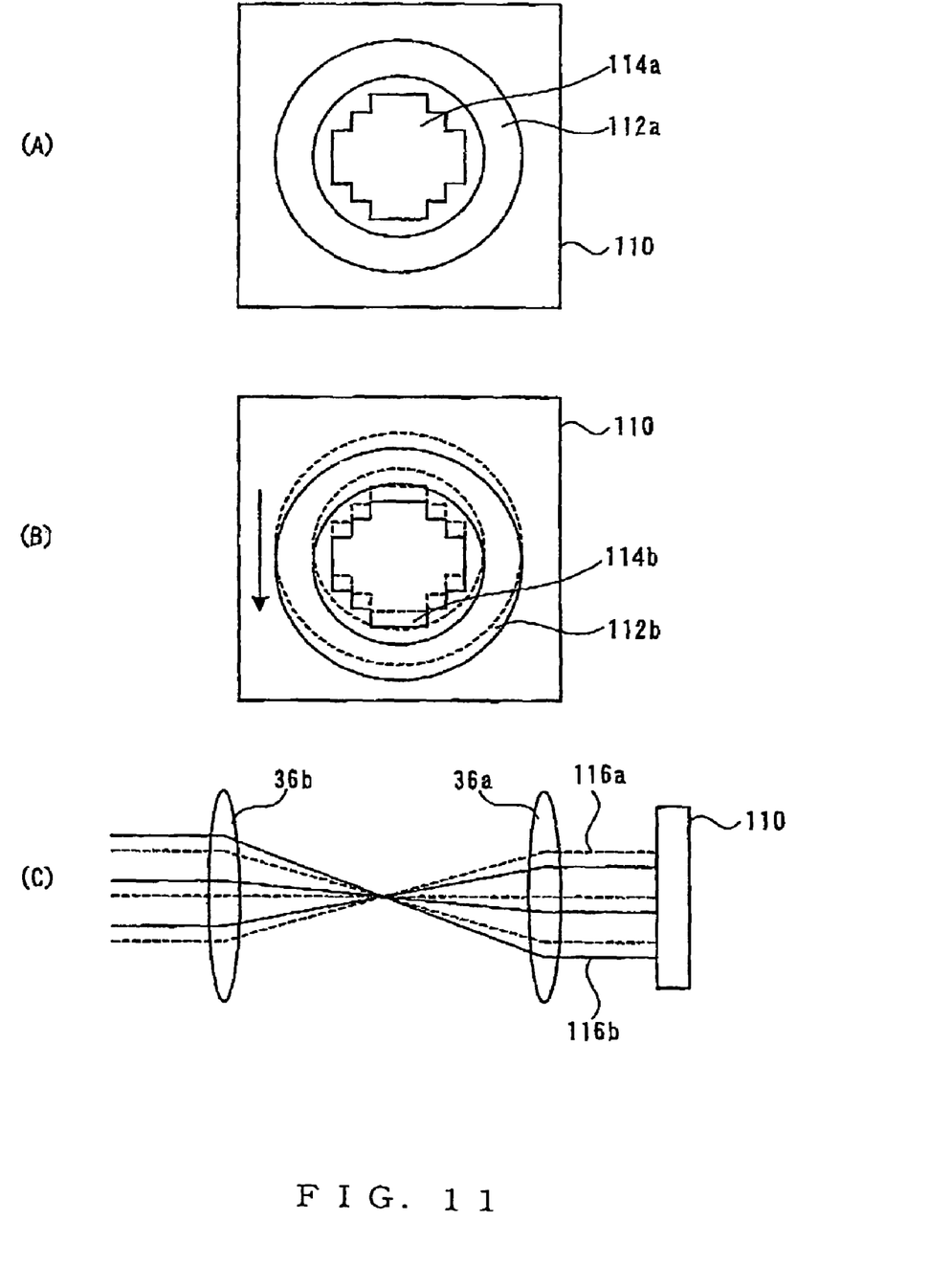
FIG. 11A to FIG. 11C are illustrations for describing another embodiment of the device for parallel-translating the light ray flux of the present invention.

By moving the entire modulation pattern of the spatial optical modulator 110 as described, the light ray flux 116, by transmitting through the relay lenses 36a, 36b, is parallel-translated in the reverse direction from the moved direction. Thus, making the entire modulation pattern of the spatial optical modulator 110 be movable in the vertical and lateral directions, it enables to deal with the inclination of the recording medium in any directions. When the moving distance of the modulation pattern increases, the change in the angle of incident of the light ray flux also increases. Therefore, by controlling the moving distance and the moving direction of the modulation pattern of the spatial optical modulator 110 according to the relative inclination between the recording light or the reproducing light and the recording medium, the light ray flux of the recording light or the reproducing light entering the objective lens can be parallel-translated so as to correct the inclination of the recording medium.

In FIG. 3 to FIG. 5, the light ray flux emitted from the light source 22 is shown as if it is formed in the same width as that of the recording light or the reproducing light by the collimator lens 24. However, in practice, the light ray flux with a wider width is formed. Thus, as shown in FIG. 11, even when the modulation patterns 112a, 113a of the spatial optical modulator 110 are moved, the recording light or the reproducing light can be generated.

With this method of moving the modulation pattern of the spatial optical modulator 110, the inclination of the recording medium can be corrected without adding another structural element. Also, the driving system is not required so that it is advantageous in terms of size-reduction.

FIG. 3 to FIG. 5 show the optical information recording/reproducing apparatus which generates the information light and the recording-specific reference light at the same time by the spatial optical modulator 28. However, it may be in a configuration in which the information light and the recording-specific reference light are generated, respectively, by splitting the light into the optical path of the information light and the optical path of the recording-specific reference light, and the information light and the recording-specific reference light are synthesized once again by the beam splitter to be irradiated onto the recording medium as the coaxial recording light. In this configuration, a device for parallel-translation may be disposed between the point where the information light and the recording-specific reference light are synthesized and the objective lens. Japanese Unexamined Patent Publication No. 11-311938 discloses an apparatus for generating the information light and the recording-specific reference light in separate optical paths.

The present invention is not limited to the above-described embodiments but various modifications are possible as necessary.

With the present invention as described above, when the parallel-translated light ray flux of the recording light or the reproducing light enters an objective lens, the angle of incident of the recording light or the reproducing light at the time of entering the recording medium changes. Thus, by controlling the parallel-translation of the light ray flux of the recording light or the reproducing light according to the relative inclination between the recording light or the reproducing light and the recording medium, the relative inclination between the recording light or the reproducing light and the recording medium can be corrected. Therefore, it is unnecessary to tilt the pickup main body itself so that the driving system can be reduced in size. Thereby, it is more suitable for size-reduction compared to the conventional case. Further, the objective lens stays in the same position so that there is no change in the focal point position of the recording light or the reproducing light. Thus, there is no need to correct the focal point position and the relative inclination between the recoding light or the reproducing light and the recording medium can be controlled by a simpler control compared to the conventional case.

Further, when the device for parallel-translation is the optical element for directing the recording light or the reproducing light towards the objective lens and the driving unit for driving the optical element, the position of the light ray flux of the recording light or the reproducing light entering the objective lens can be controlled by simply moving the optical element for directing the recording light or the reproducing light towards the objective lens in the optical axis direction. Thus, the size of the driving unit can be reduced compared to the conventional case where the pickup main body is driven. Further, it is preferable to use the pentagonal prism as the optical element for directing the recording light or the reproducing light towards the objective lens so that the light rays are deflected by precisely 90° to be emitted even when the light enters the effective plane at any angles, and the emitted image does not rotate or reversely rotate as in the case of 45° rectangular prism or the like.

Furthermore, when the device for parallel-translation is the plane glass disposed on the optical path of the recording light or the reproducing light and the driving unit for driving the plane glass, the position of the light ray flux of the recording light or the reproducing light entering the objective lens can be controlled by simply tilting the plane glass. Thus, the size of the driving unit can be reduced compared to the conventional case where the pickup main body is driven.

Furthermore, when the device for parallel-translation is the relay lens disposed on the optical path of the recording light or the reproducing light and the driving unit for driving the relay lens, the position of the light ray flux of the recording light or the reproducing light entering the objective lens can be controlled by moving the relay lens in the vertical direction with respect to the optical path. Thus, the size of the driving unit can be reduced compared to the conventional case where the pickup main body is driven.

Furthermore, when the device for parallel-translation is the reflector element disposed at the focal point position of the relay lens being disposed on the optical path of the recording light or the reproducing light and the driving unit for driving the reflector element, the position of the light ray flux of the recording light or the reproducing light entering the objective lens can be controlled by tilting the reflector element. Thus, the size of the driving unit can be reduced compared to the conventional case where the pickup main body is driven. Also, the optical path is deflected by the reflector element so that it is easier to achieve the optical information recording apparatus with a compact configuration as a whole.

Further, when the device for parallel-translation is the spatial optical modulator having a plurality of pixels for generating the recording light or the reproducing light by modulating the irradiated light with each pixel, the position of the light ray flux of the recording light or the reproducing light entering the objective lens can be controlled by simply moving the modulation pattern of the spatial optical modulator. Therefore, the inclination of the recording medium can be corrected without adding another structural element. Also, the driving system is not required so that it is advantageous in terms of size-reduction.

What is claimed is:

1. An optical information recording apparatus for recording information on a recording medium to which information is recorded using holography, the apparatus comprising:
   a light source;
   a spatial optical modulator having a plurality of pixels for generating a recording light by modulating irradiated light with each of said pixels;
   an objective lens for irradiating said recording light onto said recording medium; and
   a means for parallel-translating light ray flux of said recording light entering said objective lens according to a relative inclination between said recording light and said recording medium;
   wherein said means changes an angle of incidence of the light ray flux of said recording light entering said recording medium by parallel-translating light ray flux of said recording light and corrects said relative inclination.

2. The optical information recording apparatus according to claim 1, wherein: said means for parallel-translation is an optical element for directing said recording light towards said objective lens and a driving unit for driving said optical element; and light ray flux of said recording light is parallel-translated by moving said optical element in an optical axis direction of incoming light ray flux.

3. The optical information recording apparatus according to claim 2, wherein said optical element is a pentagonal prism.

4. The optical information recording apparatus according to claim 1, wherein: said means for parallel-translation is a plane glass disposed on an optical path of said recording light and a driving unit for driving said plane glass; and light ray flux of said recording light is parallel-translated by tilting said plane glass.

5. The optical information recording apparatus according to claim 1, wherein: said means for parallel-translation is a relay lens disposed on an optical path of said recording light and a driving unit for driving said relay lens; and light ray flux of said recording light is parallel-translated by moving said relay lens in a direction vertical to said optical path.

6. The optical information recording apparatus according to claim 1, wherein: said means for parallel-translation is a reflector element disposed at a focal point position of said relay lens being disposed on an optical path of said recording light and a driving unit for driving said reflector element; and light ray flux of said recording light is parallel-translated by tilting said reflector element.

7. The optical information recording apparatus according to claim 1, wherein: said means for parallel-translation parallel translates light ray flux of said recording light by changing the display position of modulated patterns for generating said recording light displayed on said spatial optical modulator.

8. An optical information reproducing apparatus for reproducing information from a recording medium to which information is recorded using holography, the apparatus comprising:
   a light source;
   a spatial optical modulator having a plurality of pixels for generating a reproducing light by modulating irradiated light with each of said pixels;
   an objective lens for irradiating said reproducing light onto said recording medium; and
   a means for parallel-translating light ray flux of said reproducing light entering said objective lens according to a relative inclination between said reproducing light and said recording medium;
   wherein said means for parallel-translation changes an angle of incidence of the light ray flux of said reproducing light entering said recording medium by parallel-translating light ray flux of said reproducing light and corrects said relative inclination.

9. The optical information reproducing apparatus according to claim 8, wherein: said means for parallel-translation is an optical element for directing said reproducing light towards said objective lens and a driving unit for driving said optical element; and light ray flux of said reproducing light is parallel-translated by moving said optical element in an optical axis direction of incoming light ray flux.

10. The optical information recording apparatus according to claim 9, wherein said optical element is a pentagonal prism.

11. The optical information recording apparatus according to claim 8, wherein: said means for parallel-translation is a plane glass disposed on an optical path of said reproducing light and a driving unit for driving said plane glass; and light ray flux of said reproducing light is parallel-translated by tilting said plane glass.

12. The optical information recording apparatus according to claim 8, wherein: said means for parallel-translation is a relay lens disposed on an optical path of said reproducing light and a driving unit for driving said relay lens; and light ray flux of said reproducing light is parallel-translated by moving said relay lens in a direction vertical to said optical path.

13. The optical information reproducing apparatus according to claim 8, wherein: said means for parallel-translation is a reflector element disposed at a focal point position of said relay lens being disposed on an optical path of said reproducing light and a driving unit for driving said reflector element; and light ray flux of said reproducing light is parallel-translated by tilting said reflector element.

14. The optical information reproducing apparatus according to claim 8, wherein: said means for parallel-translation parallel-translates light ray flux of said reproducing light by changing the display position of modulated patterns for generating said reproducing light displayed on said spatial optical modulator.

* * * * *